United States Patent [19]

Holoch

[11] Patent Number: 5,231,491
[45] Date of Patent: Jul. 27, 1993

[54] TELEVISION SYSTEM PROVIDING WIDE ASPECT RATIO IMAGE INFORMATION COMPATIBLE WITH A STANDARD ASPECT RATIO FORMAT

[75] Inventor: Gerhard Holoch, Munich, Fed. Rep. of Germany

[73] Assignee: Telefunken Fernseh und Rundfunk GmbH, Fed. Rep. of Germany

[21] Appl. No.: 689,261

[22] PCT Filed: Nov. 27, 1989

[86] PCT No.: PCT/EP89/01432

§ 371 Date: May 23, 1991

§ 102(e) Date: May 23, 1991

[87] PCT Pub. No.: WO90/06657

PCT Pub. Date: Jun. 14, 1990

[30] Foreign Application Priority Data

Nov. 28, 1988 [DE] Fed. Rep. of Germany ....... 3840054

[51] Int. Cl.$^5$ .................. H04N 7/04; H04N 7/01; H04N 7/00
[52] U.S. Cl. ..................................... 358/141; 358/140
[58] Field of Search ................. 358/140, 141, 142, 12, 358/11

[56] References Cited

U.S. PATENT DOCUMENTS

| | | | |
|---|---|---|---|
| 4,961,112 | 10/1990 | Sugimori et al. | 358/141 |
| 4,984,078 | 1/1991 | Skinner et al. | 358/141 |
| 5,121,204 | 6/1992 | Cida et al. | 358/141 |
| 5,142,364 | 8/1992 | Sugimori et al. | 358/141 |

FOREIGN PATENT DOCUMENTS 0432529 6/1991 European Pat. Off.
3841173 11/1989 Fed. Rep. of Germany.

OTHER PUBLICATIONS

M. A. Isnardi et al., "Encoding for Compatibility and Recoverability in the ACTV System", IEEE Transactions on Broadcasting, vol. BC-33, No. 4, Dec. 1987.
T. Nishizawa et al., "HDTV and ADTV Transmission Systems—Muse and Its Family", NHK Report at NAB Convention, Apr. 1988.
W. F. Schreiber, "Improved Television Systems: NTSC and Beyond", SMPTE Journal, Aug. 1987.
A. G. Toth et al., "NTSC Compatible High Definition Television Emission System", IEEE Transactions on Consumer Electronics, vol. 34, No. 1, Feb. 1988.
W. E. Glenn et al., "High Definition Television Compatible Transmission System" IEEE Transactions on Broadcasting, vol. BC-33, No. 4, Dec. 1987.
G. Tonge, "Compatible HDTV", Broadcast Systems Engineering, Jul. 1988.

*Primary Examiner*—James J. Groody
*Assistant Examiner*—Safet Metjahic
*Attorney, Agent, or Firm*—Joseph S. Tripoli; Eric P. Herrmann; Ronald H. Kurdyla

[57] ABSTRACT

A television signal processing system develops a television signal containing wide aspect ratio image information which is compatible with a standard aspect ratio television format. One image line is separated from every group of four successive image lines. The remaining image lines are vertically compressed, whereby vacant regions ("bars") appear along the top and bottom edges of a displayed image. The separated image lines are scrambled and inserted into the vacant regions. An image display including the vacant regions exhibits a standard aspect ratio, while the active image area between the vacant edge regions exhibits a wide aspect ratio.

17 Claims, 2 Drawing Sheets

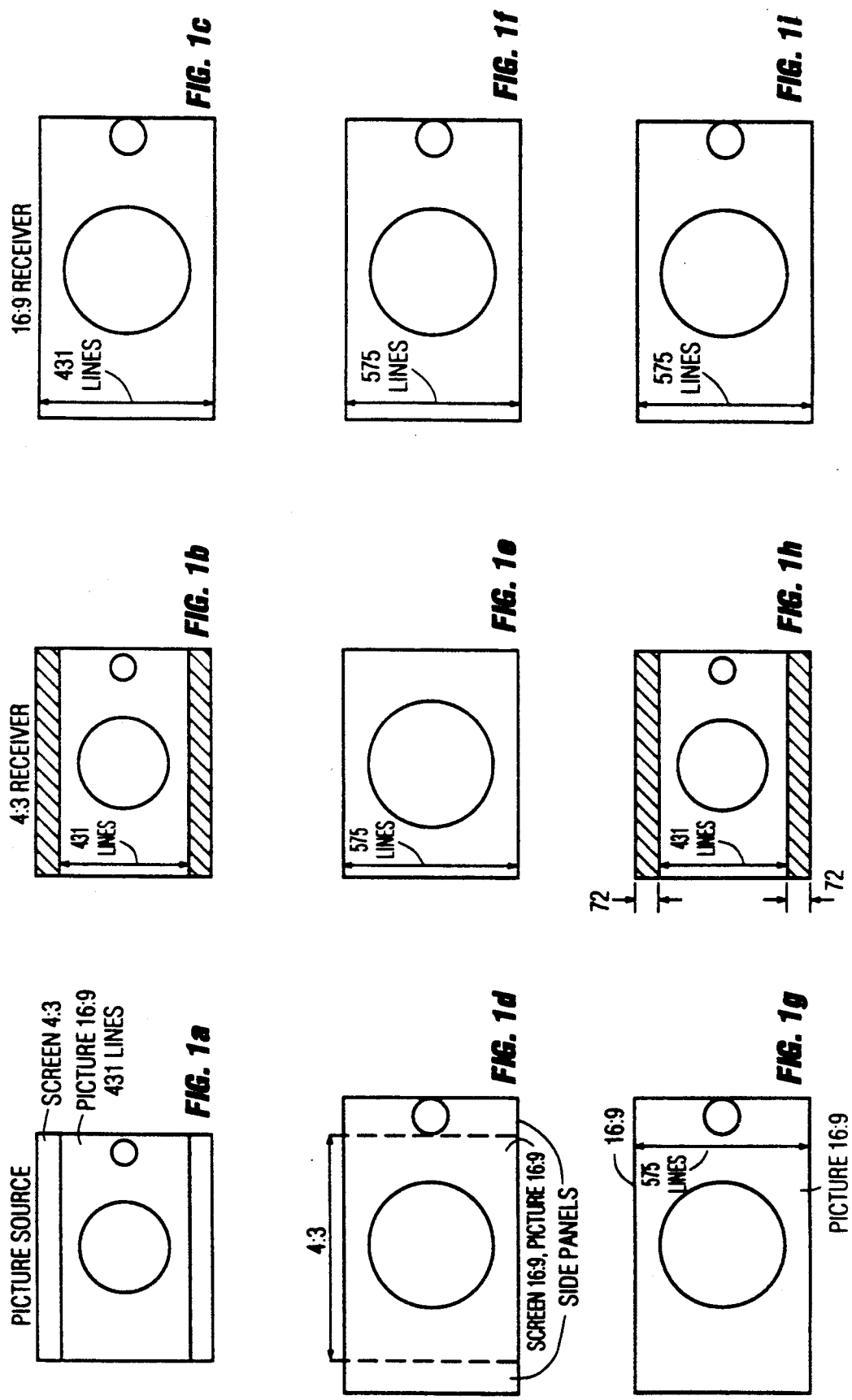

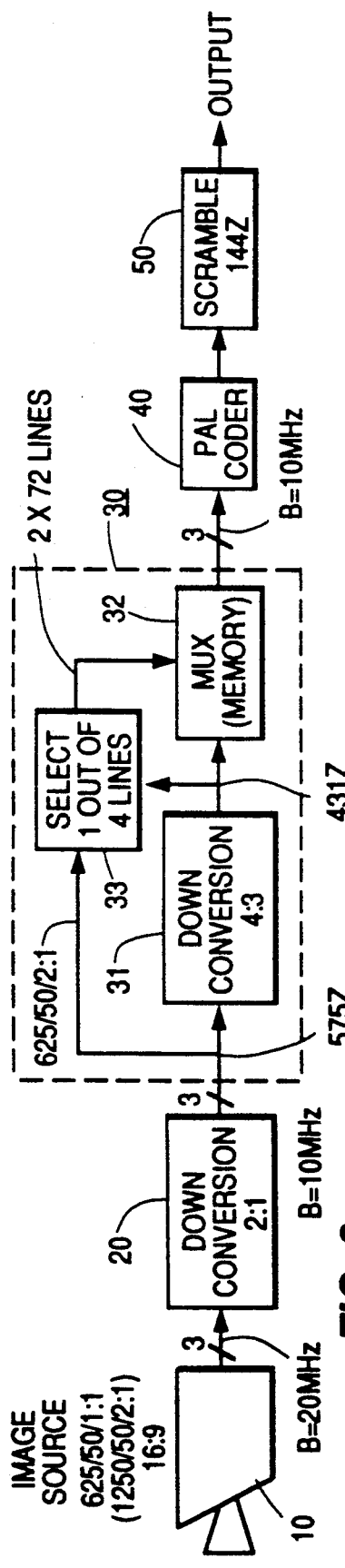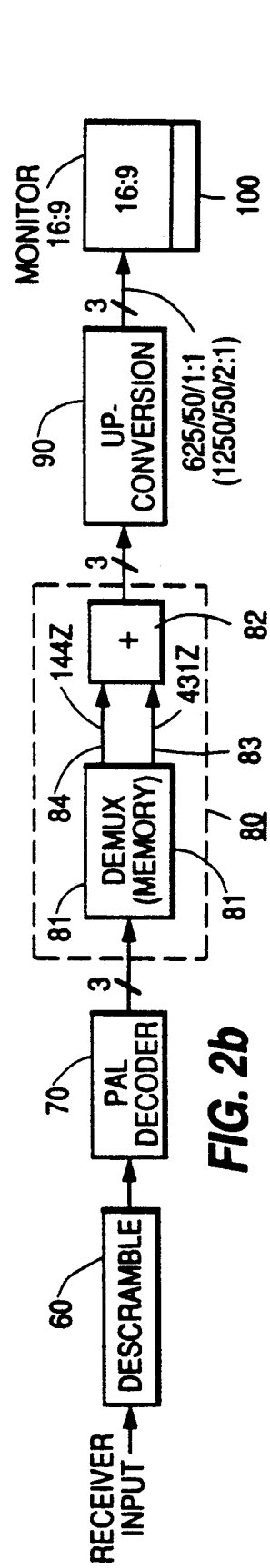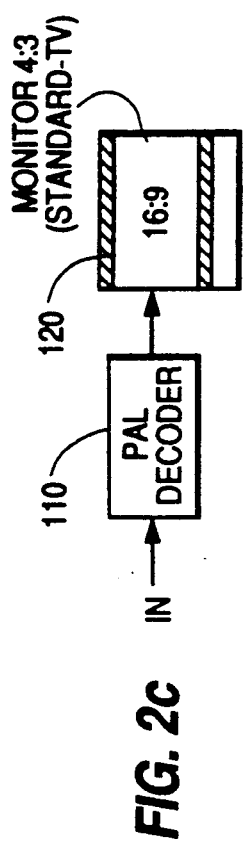

TELEVISION SYSTEM PROVIDING WIDE ASPECT RATIO IMAGE INFORMATION COMPATIBLE WITH A STANDARD ASPECT RATIO FORMAT

FIELD OF THE INVENTION

The invention concerns a compatible television signal transmission system.

BACKGROUND OF THE INVENTION

For improved television transmission systems it is preferable, particularly with regard to acceptance by the public, to increase the picture aspect ratio of television receivers from the preexisting standard aspect ratio of 4:3 to 16:9, which is the aspect ratio recommended for future HDTV standards, without losing compatibility with existing television standards such as PAL, NTSC and SECAM.

Various proposals have been made for achieving such a wider aspect ratio. Some of these proposals are illustrated by FIGS. 1(a) through 1(i).

The proposal according to FIG. 1(a) illustrates the scanning of wide screen motion pictures. A picture section with a 16:9 aspect ratio is generated by omitting lines at the top and bottom picture edges of a 4:3 aspect ratio picture. For example, with PAL and SECAM standards this means a line reduction from 575 active lines to 431 active lines. A compatible 4:3 receiver (FIG. 1b) would show the complete picture, but with only 431 active lines as well as black bars along the upper and lower picture edges. These black bars would not be present in a 16:9 receiver (FIG. 1c), but the resolution would then be reduced due to the reduced number of lines compared to a standard scanning format with 575 active lines.

In the proposal according to FIG. 1 (d), the line length is increased in relation to the picture height during the scanning process at the picture source, so that a picture with a 16:9 aspect ratio results. The side panels which complement the 4:3 aspect ratio to form a 16:9 aspect ratio image are transmitted in such a way that they cannot be processed by a standard 4:3 receiver (FIG. 1e). This results in a reproduced image without reduced vertical resolution (for example, 575 active lines with the PAL or SECAM standard). However, the picture information contained in the side panels is lost in the 4:3 receiver. The 16:9 receiver (FIG. 1f), on the other hand, reproduces the complete picture information with 575 active lines. However, the picture information contained in the side panels (FIG. 1d), which is transmitted and received separately, is spliced to the main panel, leading to visible seams.

In the proposal according to FIG. 1(g) (for example, according to D2-MAC specifications) the line length is also increased in relation to the picture height during the scanning process at the picture source, so that again a picture with a 16:9 aspect ratio is generated. Compared to the preceding proposal, however, the side panels are transmitted continuously rather than separately. The 16:9 receiver (FIG. 1i) therefore reproduces a picture with full picture information and 575 active lines, without the disadvantage of seams at the side panel splicing regions. Instead, geometric distortion occurs in a standard 4:3 receiver (FIG. 1h) if no additional measures are provided. With MAC receivers it is envisaged to modify the vertical amplitude or the time decompression process by means of a transmitted control signal which compensates for geometric distortion. However, picture information is lost at a 4:3 receiver if the line compression is altered. In the case of a change of the vertical amplitude as represented in FIG. 1(h) black bars appear along the top and bottom picture edges, however, complete picture information is reproduced. With conventional television standards such as PAL, NTSC and SECAM, however, automatic geometry correction is not impossible.

It is the object of the invention to provide a television transmission system compatible with conventional television standards (PAL, NTSC, SECAM) which allows, when a 16:9 aspect ratio picture source is used, reproduction by a 16:9 receiver with substantially full image quality, and without producing picture distortion in the case of standard 4:3 television receivers.

SUMMARY OF THE INVENTION

In accordance with the principles of the invention, a television signal containing wide aspect ratio image information and compatible with a standard aspect ratio television signal is developed from a widescreen, wide aspect ratio television signal source. An image line is separated from every group of N successive image lines within an image scanning interval, producing a separated line and remaining lines for each group. The remaining lines are processed so as to produce vacant spatial areas along the top and bottom edges of an image defined by the remaining lines. A prescribed number of separated lines are inserted into the vacant top and bottom edge areas, producing an output compatible television signal.

In an illustrated preferred embodiment of the invention, one of every four successive scan lines is separated, scrambled and inserted into the vacant regions so that the vacant regions comprise substantially equal numbers of separated lines. The vacant regions are generated by vertically compressing the remaining lines of each scanning interval. A complementary operation occurs at a wide aspect ratio receiver. The separated lines in the top and bottom edge areas are unscrambled, the remaining lines are vertically expanded, and the unscrambled separated lines are re-inserted into their original positions among the remaining lines.

In accordance with a feature of the invention, the vertical compression/expansion function can be replaced by an interpolation/inverse interpolation function.

BRIEF DESCRIPTION OF THE DRAWINGS

FIGS. 1(a)-1(i) depict image displays associated with proposals for processing and displaying wide aspect ratio television image information.

FIG. 2a is a block diagram of television signal transmitter apparatus in accordance with the principles of the present invention.

FIGS. 2b and 2c are block diagrams of television receiver apparatus in accordance with the principles of the present invention.

DETAILED DESCRIPTION OF THE DRAWING

In FIG. 2a a picture source 10 (e.g., a camera) scans a picture in a screen (raster) with a 16:9 picture format. In this example picture signals generated by source 10 correspond to a standard 625/50/2:1 format, 625/50/1:1 format or 1250/50/2:1 format, corresponding to 625 or 1250 lines respectively, a frame repetition rate of 50 Hz, and progressive (1:1) or interlaced (2:1) scanning. The band width of the picture signal at the output of source 10 is, for example, 10 MHz in the case of the 625/50/2:1 format and 20 MHz in both of the other formats.

In the case of the 625/50/1:1 format and the 1250/50/2:1 format, source 10 is followed by a first downwards converting stage 20 which converts the picture signal from the output of source 10 into a picture signal corresponding to a state of the art television standard with a 625/50/2:1 format.

The 625/50/2:1 picture signal is applied to a picture signal processing stage 30 which includes apparatus according to the invention at the transmitter. Stage 30 includes a second downwards converting stage 31 which always selects three lines out of four of the incoming picture signal. This can be achieved by separating every fourth line of the picture signal or, as will be shown later by means of an example, by interpolating three lines out of every four successive incoming lines of the picture signal. As a result of this 4:3 conversion in downwards converting stage 31, 431 active lines are generated out of the 575 active lines of the input picture signal. The output signal of stage 31 is applied to a selection stage 33, and to a multiplexer 32 (memory). Selection stage 33 compares the picture signal at the input of stage 30 with the downwards converted picture signal at the output of the second downwards converting stage 31, and processes those 144 lines, i.e., the picture information lost during the downwards conversion in stage 31. In multiplexer 32 the picture signals from converting stage 31 and from selection stage 33 are arranged so that the lines of the signal from stage 31 are located in a manner symmetrical to the picture center and are spatially compressed. In addition, one-half of the 144 lines from stage 33 are placed in the vacated spatial area along the top picture edge, and the other half of such lines are placed in the vacated spatial area along the bottom picture edge.

The output signal from multiplexer 32 (i.e., the output of picture processing stage 30) is coded in a PAL coder 40. The lines from selection stage 33 added to the spatial areas along upper and lower picture edges can be scrambled in a scrambling stage 50 following PAL coder 40 in order to appear as "noise" bars along the upper and lower picture edges on a standard 4:3 receiver 120 (FIG. 2c). These are perceived by a viewer as less disturbing than the highly compressed picture contents from the fourth lines in these bars.

The output signal from stage 30 exhibits a bandwidth of 10 MHz, corresponding to the bandwidth at the output of first downwards converting stage 20. In order to generate a compatible PAL signal from the 10 MHz picture signal, PAL coder 40 can perform split frequency processing whereby the signal spectrum up to 5 MHz is processed in a first channel, and the signal spectrum between 5 and 10 MHz is processed in a second channel. This can be advantageously achieved, for example, in accordance with a method disclosed in German Patent DE-PS 33 38 192 to avoid cross-talk between luminance and chrominance components. The second channel can be transmitted in an unused spectral region within the first channel.

The bandwidth of the picture source may also be reduced to half, whereby a bandwidth of 5 MHz can be used for picture reproduction in a 16:9 receiver.

As an alternative to the embodiment shown in FIG. 2a, first downwards converting stage 20 can be located after picture signal processing stage 30. This alternative may offer advantages for the second downwards conversion in stage 31. Furthermore, scrambling stage 50 alternatively can be arranged between the output of selection stage 33 and the input of multiplexer 32.

The downwards conversion provided by the apparatus of FIG. 2a (employing downwards converting stage 20) either from a progressive picture signal standard (625/50/1:1) or from an increased lines picture signal standard (1250/50/2:1) permits correct vertical pre-filtering of the output signal from source 10. Such pre-filtering reduces alias interference, and can advantageously be accomplished using motion adaptive techniques.

As disclosed in German Patent DE 3,929,967, it is also possible to transmit coefficients of a vertical discrete cosine transformation function in the spatial areas along the top and bottom picture edges, by means of which (coefficients) 575 active lines are gained in the 16:9 receiver from the 431 active lines and which look even more like a noise signal in a 4:3 receiver display.

The receiver side of the television transmission system is shown in FIG. 2b and includes a 16:9 monitor/display 100. The receiver signal processing is the reverse of the transmitter signal processing. The received signal is applied to a de-scrambling stage 60 which reverses the scrambling of the lines added along the upper and lower picture edges. A subsequent PAL decoder 70 generates a three component YUV (luminance/color difference) signal which is indicated in FIG. 2b by the numeral "3" at the signal output of PAL decoder 70. The YUV signal at the output of PAL decoder 70 is applied to a picture signal processing stage 80 including receiver apparatus according to the invention. Signal processing stage 80 comprises a de-multiplexer 81 (memory) which spatially decompresses the 431 lines transmitted symmetrically in relation to the picture center (appearing at a first output 83), and separates the 144 lines transmitted along the upper and lower picture edges and allocates them in a spatially correct way (appearing at a second output 84). A line combiner 82 inserts the 144 lines from second output 84 of unit 81 among the 431 spatially decompressed 431 lines from output 83 of unit 81 in correct order.

The output signal from stage 80 can be motion adaptively upwards converted by a stage 90 from a 625/50/2:1 transmission signal to a reproduction standard 625/50/1:1, 1250/50/2:1, 625/100/2:1 or 1250/100/2:1 format signal to achieve improved picture reproduction on a 16:9 aspect ratio receiver 100. Such picture reproduction is illustrated by FIG. 1(*i*) with a picture aspect ratio of 16:9 and 575 active lines in the case of the standard 650/50/2:1 or 650/50/1:1 or 625/100/2:1 format.

FIG. 2b illustrates compatible picture signal reproduction with a state of the art standard 4:3 television receiver including a monitor/display 120 and a PAL decoder 110. In this case picture reproduction is illustrated by FIG. 1(*h*) whereby—as mentioned above—the two 72 line sections (144 lines total) are respectively reproduced along the upper and lower picture edges and appear as noise bars due to scrambling by stage 50. No information is lost via reproduction in the 16:9 format on the 4:3 display 120.

To be more practical, the 16:9 receiver including display 100 can be designed as a multi-standard receiver to be able to also reproduce standard television signals with a picture aspect ratio of 4:3, since this will be required, in particular, in the case of archive picture material. For this purpose the 16:9 receiver can be arranged so that it fully writes over the entire picture width whereby information is lost along the upper and lower picture edges. Alternatively, the 16:9 receiver can be designed so that with reduced screen (raster) magnitude (or, respectively, reduced vertical amplitude and compression) black bars appear along the left and right picture edges.

As mentioned previously, as an alternative to selecting three out of four lines of the picture signal received at the input of the picture signal processing stage, three lines can be interpolated out of four successive lines. An example of such interpolation is shown by following table I.

TABLE I

| Line No. | Line designation | Interpolated 431 lines | Separated 144 lines |
|---|---|---|---|
| 1 | A | A | |
| 2 | B | $\frac{2}{3}*B + \frac{1}{3}*C = B'$ | |
| 3 | C | $\frac{1}{3}*C + \frac{2}{3}*D = C'$ | C |
| 4 | D | | |
| 5 | A | A | |
| , | , | , | , |
| , | , | , | , |

A compatible 4:3 receiver evaluates only the 431 lines in the 16:9 format. In an improved 16:9 receiver all 575 active lines are reconstructed according to following table II:

TABLE II

| Line No. | Reconstruction from the 431 lines and the 144 lines | Line designation |
|---|---|---|
| 1 | A | A |
| 2 | $3/2*B' - \frac{1}{2}*C$ | B |
| 3 | C | C |
| 4 | $3/2*C - \frac{1}{2}*C$ | D |
| , | , | , |
| , | , | , |

For television transmission systems with different numbers of lines, for example the NTSC system with 525 lines, the numbers of lines and the frequencies stated in the preceding description are adapted accordingly.

I claim:

1. In a system for providing, from a widescreen television signal source, a television signal containing wide image aspect ratio information compatible with a standard television signal containing image information having an aspect ratio less than that of said compatible television signal, apparatus comprising:
   means for separating an image line from every group of N successive image lines within an image scanning interval for producing a separated line and remaining lines for each said group, where N is significantly less than the total number of lines defining an image scan within said scanning interval;
   means for processing said remaining lines of each said group to produce vacated spatial areas along top and bottom edges of an image defined by said remaining lines; and
   means for inserting a predetermined number of separated lines into said vacated area along said top edge, and a predetermined number of separated lines in said vacated area along said bottom edge, thereby forming an output compatible television signal for transmission.

2. Apparatus according to claim 1, wherein
   said number N is 4; and
   said remaining lines are substantially equally distributed along said top and bottom edges.

3. Apparatus according to claim 1, wherein
   said wide aspect ratio is 16:9.

4. Apparatus according to claim 1 and further including
   means for scrambling said separated lines inserted into said vacated image areas.

5. Apparatus according to claim 1, wherein
   said processing means includes means for spatially compressing said remaining lines vertically to produce said vacated spatial areas.

6. Apparatus according to claim 1, wherein
   said processing means includes means for vertically interpolating image lines for producing said vacated areas.

7. Apparatus according to claim 6, wherein
   said number N is 4; and
   said interpolation means interpolates three of four lines within each said group.

8. Apparatus according to claim 1 and further including
   means, located prior to said separating means, for converting signals processed by said separating means into a line interlaced signal in accordance with a desired television signal format.

9. Apparatus according to claim 1 and further including
   means, located after said inserting means, for converting said output compatible signal into a line interlaced signal in accordance with a desired television signal format.

10. Apparatus according to claim 1 and further including
    means, located prior to said separating means, for downwards converting the number of image lines of signals processed by said separating means in accordance with a desired television signal format.

11. Apparatus according to claim 1 and further including
    means, located after said inserting means, for downwards converting the number of image lines of said output compatible signal in accordance with a desired television signal format.

12. Apparatus according to claim 1, wherein
    said output compatible television signal includes horizontal high frequency components disposed in otherwise unused multi-dimensional spectral areas.

13. In a system for receiving a television signal containing wide aspect ratio image information, said television signal containing a separated line from respective groups of N successive image lines within an image scanning interval and having remaining lines within each said line group, where N is significantly less than the total number of lines defining an image within said image scanning interval, said separated lines having been inserted into vacated spatial regions along top and bottom edges of an image defined by said remaining lines; apparatus comprising:
    means for processing said remaining lines within each said line group so as to additionally occupy said spatial regions along said top and bottom image edges;

means for inserting said separated lines from said top and bottom edge regions into positions within each said line group previously occupied by said separated lines, respectively, to produce a wide aspect ratio signal; and display signal processing means responsive to said wide aspect ratio signal.

14. Apparatus according to claim 13 and further including means for unscrambling said separated lines inserted into said previously occupied positions.

15. Apparatus according to claim 13, wherein said means for processing said remaining lines includes means for vertically expanding said remaining lines.

16. Apparatus according to claim 13, wherein said means for processing said remaining lines includes means for inversely interpolating said remaining lines.

17. Apparatus according to claim 13 and further including image line formatting means for enhancing the resolution of a reproduced image.

* * * * *